(12) United States Patent
Novikov et al.

(10) Patent No.: US 10,582,089 B2
(45) Date of Patent: Mar. 3, 2020

(54) IMAGE DATA INTERPOLATION

(71) Applicant: Apical Ltd, Cambridge (GB)

(72) Inventors: Maxim Novikov, Loughborough (GB); Viacheslav Chesnokov, Loughborough (GB); Gennady Manokhin, Ely (GB)

(73) Assignee: Apical Limited, Cambridge (GB)

(*) Notice: Subject to any disclaimer, the term of this patent is extended or adjusted under 35 U.S.C. 154(b) by 0 days.

(21) Appl. No.: 16/192,630

(22) Filed: Nov. 15, 2018

(65) Prior Publication Data

US 2019/0149697 A1 May 16, 2019

(30) Foreign Application Priority Data

Nov. 16, 2017 (GB) .................................. 1719000.0

(51) Int. Cl.
*H04N 1/60* (2006.01)

(52) U.S. Cl.
CPC ......... *H04N 1/6019* (2013.01); *H04N 1/6025* (2013.01); *H04N 1/6058* (2013.01)

(58) Field of Classification Search
None
See application file for complete search history.

(56) References Cited

U.S. PATENT DOCUMENTS

| | | | |
|---|---|---|---|
| 5,528,292 A * | 6/1996 | Ikeda | G06T 3/4007 348/222.1 |
| 5,581,376 A | 12/1996 | Harrington | |
| 2007/0070366 A1 * | 3/2007 | Heydinger | H04N 1/6019 358/1.9 |
| 2010/0053653 A1 * | 3/2010 | Hatori | H04N 1/40006 358/1.9 |
| 2012/0193208 A1 * | 8/2012 | Shin | H01H 13/85 200/512 |

FOREIGN PATENT DOCUMENTS

| | | | | |
|---|---|---|---|---|
| EP | 1487192 A2 | 12/2004 | | |
| GB | 2318943 A | 5/1998 | | |
| GB | 2318943 A | * 5/1998 | ........... | H04N 1/6058 |

OTHER PUBLICATIONS

Combined Search and Examination Report dated May 11, 2018, on GB Application No. GB1719000.0.

* cited by examiner

*Primary Examiner* — Miya J Williams
(74) *Attorney, Agent, or Firm* — EIP US LLP

(57) ABSTRACT

A method of image data interpolation. The method includes obtaining transform data associated with a plurality of sampling points, each sampling point located on a boundary of a region. The transform data is processed to generate additional transform data associated with an additional sampling point located on a boundary of a subregion of the region. An interpolation process is performed. The interpolation process includes processing image data associated with a point within the subregion with the additional transform data, thereby generating interpolated image data representative of an interpolated data value at the point. This patent application further relates to a method including obtaining transform data associated with points corresponding to a surface of a region and generating additional transform data associated with at least one interior point of the region. Image data associated with a further interior point of the region is interpolated using at least the additional transform data.

20 Claims, 7 Drawing Sheets

---

100 — Obtain transform data associated with a plurality of sampling points, each sampling point located on a boundary of a region 102 — Process transform data to generate additional transform data associated with an additional sampling point located on a boundary of a subregion of the region 104 — Perform interpolation process comprising processing image data associated with a point within the subregion with the additional transform data, thereby generating interpolated image data representative of an interpolated data value at the point

IMAGE DATA INTERPOLATION

CROSS-REFERENCE TO RELATED APPLICATIONS

This application claims priority to United Kingdom Application No. GB1719000.0 filed on Nov. 16, 2017, under 35 U.S.C. § 119(a), the entirety of which is incorporated by reference.

TECHNICAL FIELD

The present invention relates to interpolation of image data and to apparatus for interpolation of image data.

BACKGROUND

It is known to store image data representing image values at lattice points of a uniform grid. Image values for intermediate points that do not coincide with a lattice point may be approximated by interpolating the image values corresponding to the lattice points It is desirable to provide improved image data interpolation methods, which are for example more accurate or more efficient.

BRIEF DESCRIPTION OF THE DRAWINGS

Further features will become apparent from the following description, given by way of example only, which is made with reference to the accompanying drawings.

DETAILED DESCRIPTION

Details of systems and methods according to examples will become apparent from the following description, with reference to the FIGS. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Figure 1:
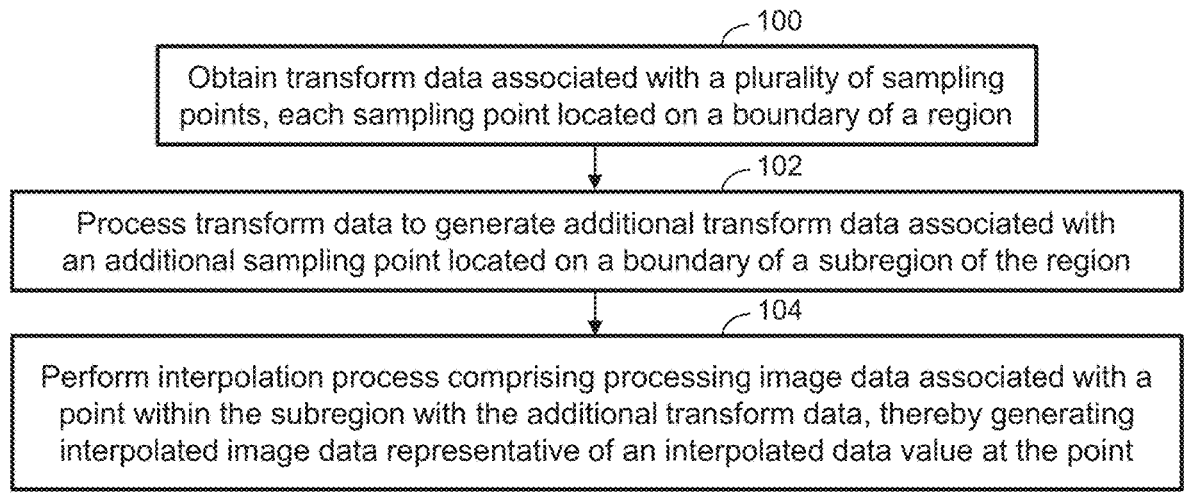
FIG. 1 is a flow diagram illustrating a method of image data interpolation according to first examples.

FIG. 1 is a flow diagram illustrating a method of image data interpolation according to first examples. At block 100 of FIG. 1, transform data associated with a plurality of sampling points is obtained. The transform data for example represents a transformation that may be applied to an image data value, such as a colour value. For example, the transformation data may represent a transformation between two different colour spaces. The transform data may be stored for the plurality of sampling points (which may each coincide with predetermined pixel locations of an image). The plurality of sampling points may correspond to a subset of pixel locations. Thus, the transform data may be stored for a subset of pixel locations rather than for each pixel location, to reduce storage requirements.

Each sampling point is located on a boundary of a region, which is for example a multidimensional region such as a two- or three-dimensional region. An extent of the region may therefore be defined by the boundary on which the sampling points are located. The region is a spatial region in a space for representing image data values to be transformed, rather than a physical region. Nevertheless, for ease of understanding, the region may be illustrated as occupying a spatial extent within a coordinate system corresponding to the space. For example, each coordinate of the coordinate system may correspond to a dimension of the space.

At block 102 of FIG. 1, the transform data is processed to generate additional transform data associated with an additional sampling point located on a boundary of a subregion of the region. At block 104 of FIG. 1, an interpolation process is performed. The interpolation process in these examples includes processing image data associated with a point within the subregion with the additional transform data, thereby generating interpolated image data representative of an interpolated data value at the point.

The additional sampling point in this example is located on a boundary of a subregion of the region, which is a smaller region than the region. For example, the subregion may be a subset of the region. Thus, the additional sampling point may be located closer to the point for which the interpolated data value is to be calculated. Hence, by using additional transform data associated with the additional sampling point as part of the interpolation process, the interpolation process may be performed using the subregion, which is a smaller region than otherwise. This may improve the accuracy of the interpolation process as the additional transform data may more accurately reflect the transformation to be applied at the point, as the additional transform data is associated with the additional sampling point, which may be closer to the point than sampling points located on the boundary of the (larger) region. In contrast, in interpolation methods in which solely the transform data associated with the sampling points located on the boundary of the region is used, the transform data may be a less accurate approximation of the transformation to be applied at the location of the point, due to the larger distance between the boundary of the region and the point.

Figure 2:
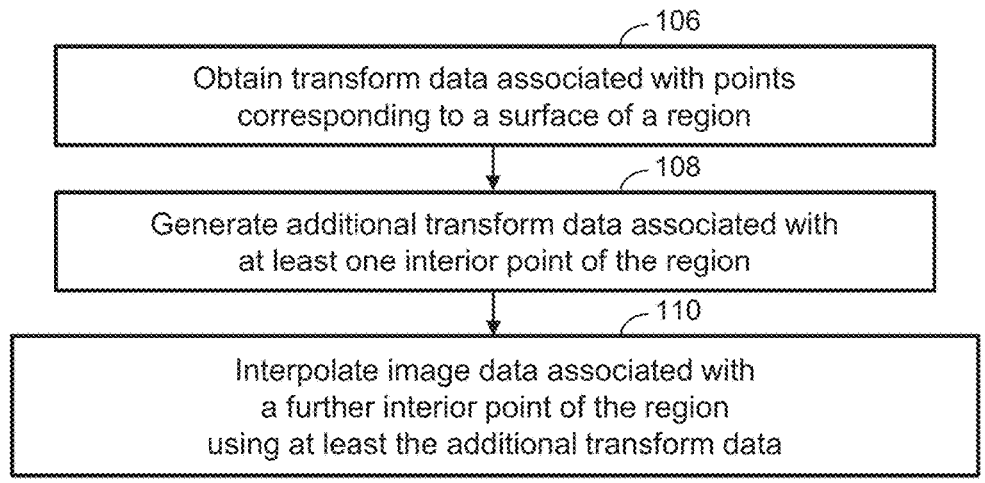
FIG. 2 is a flow diagram illustrating a method of image data interpolation according to second examples.

FIG. 2 is a flow diagram illustrating a method according to second examples. At block 106 of FIG. 2, transform data associated with points corresponding to a surface of a region is obtained. The region of the second examples may be similar to the region of the first examples and may therefore correspond to a spatial region in a space in which a transformation is to be applied. For example, the region may be considered to correspond to a polyhedron in the space, with a surface of the region corresponding to a surface of the polyhedron. At block 108 of FIG. 2, additional transform data associated with at least one interior point of the region is generated. For example, the at least one interior point may be a point within the region, which does not lie on the surface of the region. For example, if the region may be considered to correspond a polyhedron, the at least one interior point may be positioned inside the polyhedron rather than on a surface of the polyhedron. At block 110 of FIG. 2, image data associated with a further interior point of the region is interpolated using at least the additional transform data. The further interior point is for example different from the at least one interior point for which the additional transform data is generated, as otherwise an interpolation process is typically not needed. The interpolation of the image data may therefore be used to generate an interpolated data value associated with the further interior point.

Similarly to the first examples, methods in accordance with the second examples may involve an interpolation process within a smaller region than otherwise. For example, the at least one interior point of the region may correspond with a boundary of a subregion of the region, and the interpolation process may use data associated with the boundary of the subregion. In this way, the second examples may also provide a more accurate interpolation process.

To put the first and second examples into context, example uses of interpolation methods such as those of the first and second examples will first be described with reference to FIGS. 3 and 4. Subsequently, further features of methods in accordance with the first and second examples will be described in more detail with reference to FIGS. 5 to 8.

As explained above, image interpolation typically involves the approximation of a data value associated with a point or region of an image (such as a pixel intensity or a colour value in a given colour space) based on data values of surrounding points or regions. Image interpolation may therefore be used to approximate a transformation or conversion of a data value at a given point based on transformations or conversions associated with surrounding points or regions. Interpolation of image data may be used for a variety of different purposes and in a number of different contexts. Examples described herein are merely illustrative examples, though, and interpolation of image data may be used for various other purposes.

Interpolation may be used for a colour management process, for example. Colour management relates to the conversion of colours between different colour representations. Colour management may be used in various different scenarios, such as to map colours from a device-independent colour space to a device-dependent colour space (which may be a device-specific colour space), so that output colours are displayed as accurately as possible. Colour management may therefore be used to obtain matching or similar colours for the same image across various different devices, such that the same visual appearance of the image may be achieved, regardless of the device used to display the image. Alternatively, colour management may be used to provide an appropriate fusion of data elements in different colour spaces. For example, image data may have an element corresponding to a user interface in one colour space, such as the sRGB (standard red, green, blue) colour space, and a different element corresponding to a high dynamic range (HDR) clip in a different colour space, such as the Rec. 2020 colour space. Colour management may be also be used to enhance colours prior to their display. In other examples, colour management may involve clipping or limiting colour values to a predefined range of colour values, such as where colour values for an image fall outside this range. Clipping may involve soft clipping. Soft clipping typically allows a gamut of an image to be managed. For example, colours of an image may be mapped from a wider or larger gamut to a narrower, smaller or more limited gamut. Generally, a greater amount of detail in the image may be retained with soft clipping compared to hard clipping. As an illustrative example, the most saturated red in the Rec. 2020 colour space may correspond to a value of over 1.5 in the Rec. 709 colour space. Hence, all saturated reds transformed from the Rec. 2020 colour space to the Rec. 709 colour space would look identical if clipped at 1. In contrast, soft clipping allows one colour space to be non-linearly mapped to a different colour space in a way that preserves details that would otherwise be lost in a hard clipping process, without changing less saturated colours. Colour management may also or alternatively involve gamut expansion, in which the gamut or range of colours in an image is extended or increased.

Image data interpolation may also or alternatively be used for colour enhancement. Colour enhancement may be used to intensify all or a subset of colours of an image, for example to achieve a desired visual or artistic effect. For example, one or more colours may be enhanced so they appear more distinct, vivid or intense compared to the image prior to colour enhancement or compared to other colours of the image. For example, colour enhancement may be used to make a blue sky in an image appear bluer or to make green grass appear a more vivid green.

Figure 3:
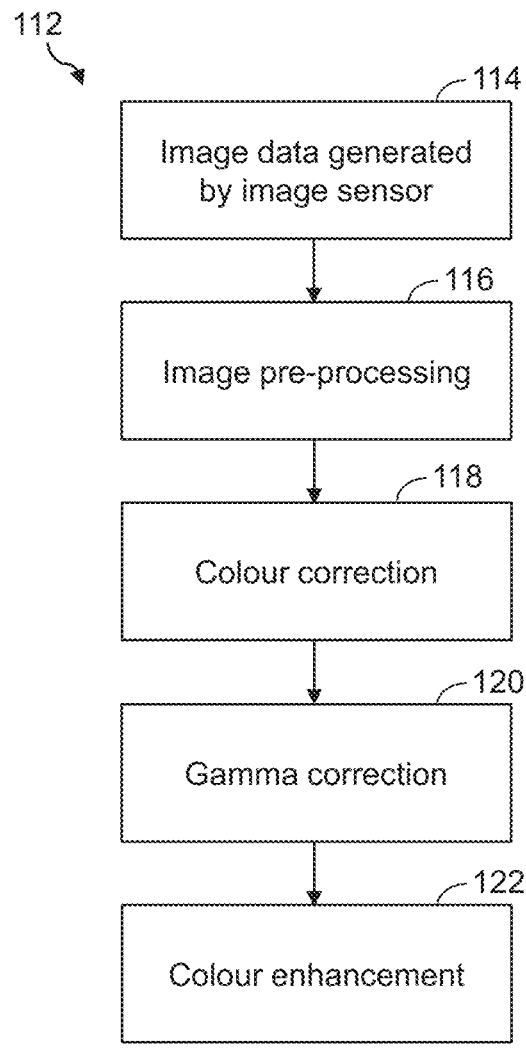
FIG. 3 is a block diagram illustrating schematically an example of part of an image signal processing pipeline.

FIG. 3 provides a schematic example of a context in which image interpolation may be used. FIG. 3 shows schematically an example of part of an image signal processing pipeline 112. The image signal processing pipeline may for example be implemented by or in conjunction with an image capture device such as a camera. Such an image capture device may be a standalone device or may be incorporated in other devices such as a smartphone.

At block 114 of FIG. 3, image data is generated by an image sensor. Image sensors typically include an array of sensor pixels, which may be any suitable photosensors for capturing images. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS). The image data may be in any suitable format, such as a raw image format. For example, the image data may be streamed from the image sensor, with or without being saved to a framebuffer, without saving the raw image data to a file. In such cases, image data obtained after processing of the raw image data may, however, be saved to a file.

At block 116 of FIG. 3, the image data undergoes pre-processing. The pre-processing for example involves routines or steps to reduce noise, correct errors or refine the image represented by the image data. For example, the pre-processing may involve at least one of a noise reduction process, a process to correct for defective pixels, a demosaicing process, a multiframe stitching process or a dynamic range adjustment process, which may involve tone mapping to adjust a dynamic range of the image represented by the image data.

At block 118 of FIG. 3, the image data undergoes a colour correction process. The colour correction process may be performed using an interpolation process as described in examples herein. The colour correction process may involve mapping colours between two different colour spaces, to transform the colour of a pixel of an image to a target output colour. Colours may be represented in multi-dimensional colour spaces, such as the RGB (red, green, blue) colour space, the sRGB (standard red, green, blue), the YUV colour space (where Y represents a luma component and U and V each represent a different chrominance component), the Digital Cinema Initiatives (DCI) P3 colour space (sometimes referred to as DCI-P3 or DCI/P3), the International Commission on Illumination (CIE) 1931 XYZ colour space, in which three variables (X, Y and Z, or tristimulus values) are used to model a colour, or the CIE 1976 (L*, a*, b*—CIELAB or 'LAB') colour space, in which three variables represent lightness (L) and opposing colour dimensions (a and b). A point in such a colour space may be considered to represent a colour value and dimensions of the colour space may be considered to represent variables within the colour model. For example, in the sRGB colour space, the RGB variables may represent different intensities or quantities of red, green or blue, respectively, which may be represented on a scale, such as a scale from 0 to 255 for 8-bit sRGB. Usually, though, a higher bit depth is used to represent colours for an image signal processing pipeline.

In examples, the colour correction process involves transforming a given input colour from a 3D input colour space to a 3D output colour spaces. In such examples, for a given input colour, the colour correction process may involve looking up or retrieving a corresponding output colour in a three-dimensional (3D) look-up table (LUT). The 3D LUT in these cases represents a mapping between the input colour space and the output colour space, in order to transform or map colours from the input colour space to the output colour space. However, such a 3D LUT typically includes merely a subset of possible input colours. Thus, in general, the input colour to be converted will not exactly match one of the input colours in the 3D LUT. To estimate the output colour associated with input colours that do not exist in the 3D LUT, an interpolation process (such as the interpolation processes described further herein) may thus be used. These interpolation processes may involve determining the output colour for a given input colour based on or using a mapping between input colours and corresponding output colours as stored in the 3D LUT, as will be described further below.

After colour correction, the image signal processing pipeline 112 of FIG. 3 may involve further processes or algorithms to improve the image quality, such as an image sharpening process. At block 120 of FIG. 3, the image data is further processed to perform a gamma correction process. Gamma correction is typically a non-linear operation that may be defined using the following power-law expression:

$$V_{out} = AV_{in}^{\gamma}$$

where $V_{out}$ is an output value, A is a constant, $V_{in}$ is an input value and γ is a gamma value. The input and output values are for example luminance or tristimulus values of pixels of the image. It is to be appreciated, though, that this is merely an example expression for gamma correction; other functions, such as those including partially-linear segments, may be used for gamma correction processes in other examples.

At block 122 of FIG. 3, a colour enhancement process is performed. The colour enhancement process may also involve an interpolation process, such as the interpolation processes described herein. However, rather than converting image data between two different colour spaces, the colour enhancement process may instead involve performing a conversion between an input and an output colour value within the same colour space. Subsequently, the image data may be output, for further processing, storage or display, for example. For example, typically the colour enhancement process is not the final stage of an image processing pipeline (although it may be in some cases).

Figure 4:
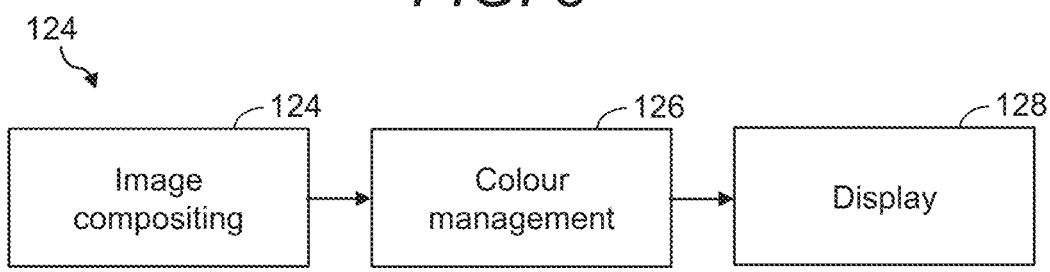
FIG. 4 is a block diagram illustrating schematically an example of part of a graphics processing pipeline.

FIG. 4 provides a schematic example of a different context in which image data interpolation may be used. FIG. 4 shows schematically an example of part of a graphics processing pipeline 124. There are typically, however, other elements and stages of graphics processing pipelines that are not illustrated in FIG. 4.

A graphics processing pipeline such as that of FIG. 4 is a sequence of actions that may be performed by a graphics processor such as a GPU. For example, an application, such as a game, executing on a host processor, such as a central processing unit (CPU), may request graphics processing operations to be performed by an associated graphics processor, which in this example is a graphics processing unit (GPU). To do this, the application generates application programming interface (API) calls that are interpreted by a programming interface, which in this example is a driver for the GPU. The driver runs on the host processor. The driver generates appropriate commands to the GPU to generate the graphics output requested by the application. A set of commands is provided to the GPU in response to the commands from the application. The commands may be to generate a frame to be displayed on a display device coupled to or in communication with the host processor and/or the GPU. The GPU may be a tile-based renderer, which produces tiles of a render output data array to be generated.

A typical graphics processing pipeline includes a number of shades, such as a vertex shader, a hull shader, a tesselator, a domain shader, a geometry shader, a tiler, a rasterization stage, a fragment shading stage, a texture mapping stage, a blending stage, a tile buffer output stage and a downsampling and writeout stage (not shown in FIG. 4). After these stages, the image data may be in the form of an array of pixel data corresponding to pixels of an output device. The output device is for example a display device for displaying an image, which may be a display screen of or coupled to a computing device such as a smartphone; tablet, laptop or desktop computer; or personal digital assistant, or television screen.

At block 124 of FIG. 4, an image compositing process is performed, in which multiple source images (for example represented by multiple sets of image data) are combined to generate an output image, which may correspond to a frame to be displayed by the output device. The image compositing process of block 124 may be performed after the downsampling and writeout stage of a graphics processing pipeline, for example. Block 126 of FIG. 4 involves a colour management process in which image data representative of the frame is mapped to an appropriate output colour space for display by the output device. For example, the image data prior to the colour management process of block 126 may be in a device-independent colour space such as the sRGB, YUV or DCI-P3 colour spaces. The colour management process may therefore involve mapping input colours in a device-independent colour space, which may be a standard colour space, to a device-dependent colour space. A colour in a device-dependent colour space may have a different perceived colour when input to two different output devices.

For example, a known colour management process may involve the use of an ICC profile, which is a set of data to characterize an input or output device or a colour space in accordance with a standard set by the International Colour Consortium (ICC), for example with reference to a mapping between a device or a target colour space and a given input colour space, which may be referred to as a profile connection space (PCS). The PCS is either the CIELAB or CIEXYZ colour space and the mapping may be specified using a table (to which interpolation may be applied for conversions between values that are not present in the table) or through a parameterised transformation.

In this example, though, the colour management process of block 126 involves the interpolation process of the examples described herein.

At block 128 of FIG. 4, the output frame is transferred to the output device for display. Block 128 may involve other processing to further correct the image or improve the image quality or to ready the image for processing.

Figure 5:
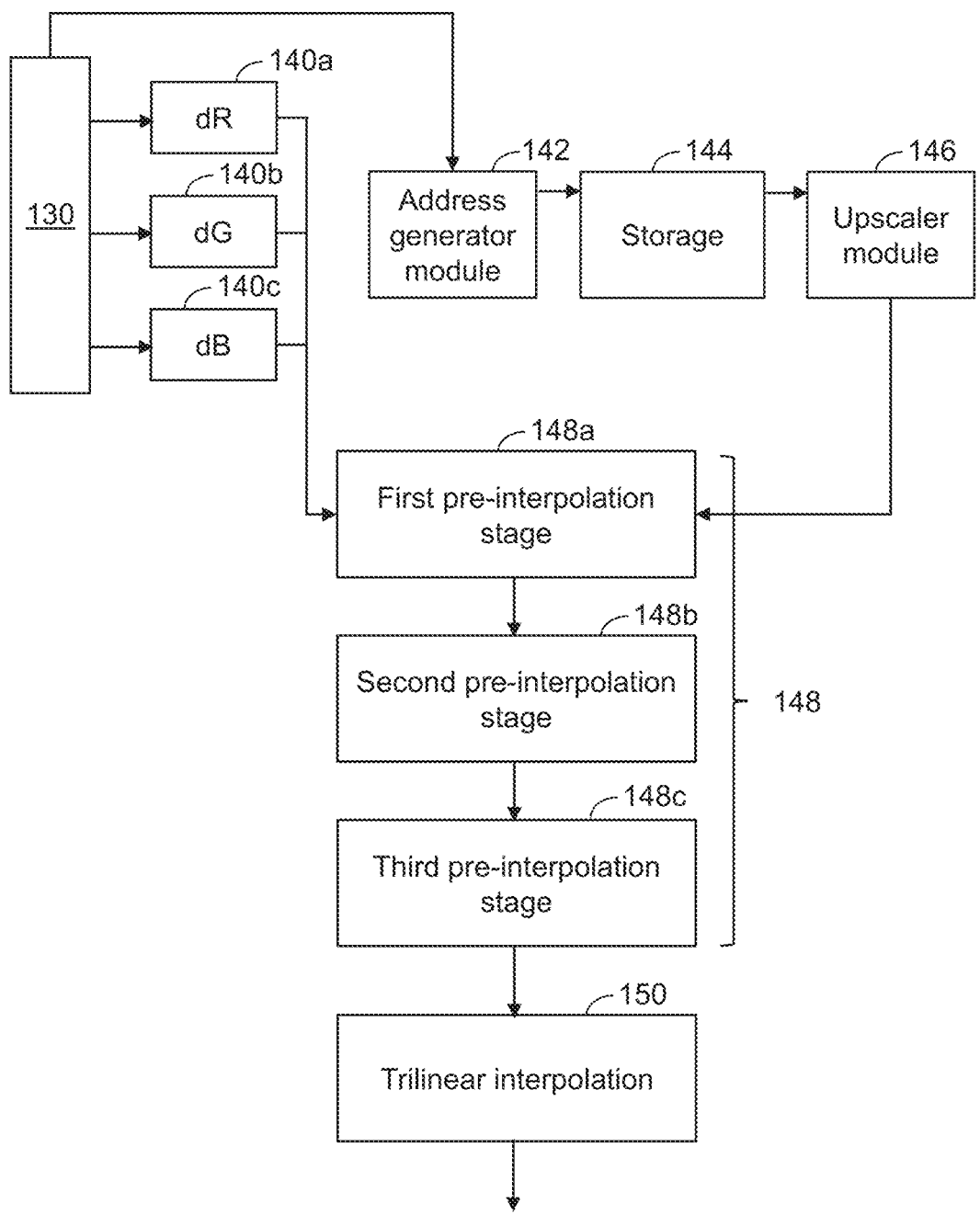
FIG. 5 is a block diagram illustrating example interactions between internal components of an apparatus during performance of the example methods described herein.

FIG. 5 is a block diagram illustrating example interactions between internal components of an apparatus during performance of the example methods described herein. Various features of the interactions shown in FIG. 5 are described in more detail below with reference to FIGS. 6 to 8.

FIG. 5 illustrates a colour management example in which image data is converted between two different colour spaces. However, as will be appreciated by the skilled person, methods similar to that of FIG. 5 may also be used for other examples that involve image data interpolation, such as those examples described above.

In FIG. 5, image data 130 is received. The image data 130 in the example of FIG. 5 represents colour channel data for n colour channels in a first colour space, where in this example n is three and the first colour space is the Rec. 2020 colour space. In other words, the image data 130 includes colour channel data for each of the red, green and blue colour channels. The colour channel data for example represents a quantity of each of the colour channels the colour channel data represents, which as explained above may be represented on a scale, such as a scale from 0 to 255, or a scale with a higher bit depth, such as a scale from 0 to a higher number than 255.

Figure 6:
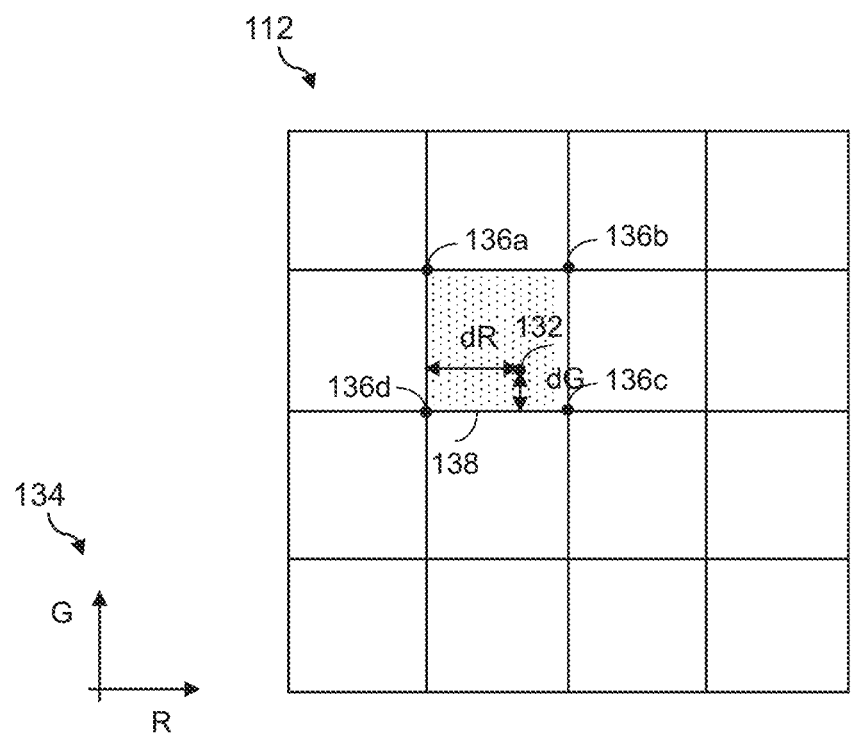
FIG. 6 illustrates schematically an example of identifying a region for interpolation.

The image data 130 in this example is associated with a point in a region. The region may be considered to be a spatial region in a space associated with a representation of the image data. In this example, the region may be represented as a 3D region in the first colour space (which is the Rec. 2020 colour space in this case). The Rec. 2020 colour space for example includes red, green and blue (RGB) primary colours. Colours in the Rec. 2020 colour space may therefore be represented as various different quantities of these RGB primaries. In other words, the RGB values represented by the image data, which for example represent the intensity of red, green and blue colours associated with a particular pixel of an image, may be considered to correspond to a point in the Rec. 2020 colour space. The location of the point, which may be represented as a 3-dimensional coordinate, may be considered to correspond to the RGB values. This is illustrated in FIG. 6, which shows schematically a point 132 in an initial coordinate system 134. In this example, each dimension of the initial coordinate system 134 corresponds with a different colour of the colour space. In this example, the x-axis of the initial coordinate system 134 corresponds with red data values and the y-axis of the initial coordinate system 134 corresponds with green data values. The illustration of FIG. 6 is in two dimensions only, for ease of illustration. However, it is to be appreciated that the z-axis of the initial coordinate system 134 in this example (which is not shown in FIG. 6) corresponds with blue data values.

The example of FIGS. 5 to 8 involves an interpolation process, based on the image data 130, to calculate an interpolated data value associated with the point. The interpolation process in this example is to convert the image data 130 from the first colour space (the Rec. 2020 colour space in this example) to a second, different, colour space (the DCI-P3 colour space in this example). In other words, the interpolation process is used to approximate the interpolated data value associated with the point in the second colour space, based on a received value associated with the point in the first colour space (and based on additional transform data, as described further below). The interpolated data value may be represented by interpolated image data, which may be generated as described further below.

In the example of FIGS. 5 to 8, before performing the interpolation process, a region 138 of the colour space that includes the point is identified. In this case, the region 138 corresponds with a three-dimensional region in the initial coordinate system 134, which in this example is a cube (illustrated as a square in the two-dimensional representation of FIG. 6). A plurality of sampling points, 136*a*, 136*b*, 136*c*, 136*d*, which may be referred to collectively with the reference numeral 136, are located on a boundary of the region and may therefore be considered to define an extent of the region 138. In this example, each of the sampling points is located at a respective corner or vertex of the region 138 (although only the sampling points 136 are labelled in FIG. 6, for clarity). However, in other examples, the sampling points may be located at other positions on the boundary of the region. The sampling points are associated with transform data. For example, the transform data may represent a respective transform associated with each of the sampling points. The transform data associated with the sampling points may be stored in a LUT, which in this case is a 3D LUT as the image data is three-dimensional image data, i.e. with one dimension for each of the red, green and blue colour values. Each sampling point may be associated with a different respective element of the transform data. In such examples, a position of an element of the transform data within the LUT may be indicative of the sampling point to which that element corresponds. Alternatively, a position of the sampling point and the element of the transform data that corresponds to the sampling point may be stored in the LUT for each of the sampling points.

The colour space may be divisible into a plurality of predetermined regions. This can be seen in FIG. 6, in which the colour space is divisible into 16 regions (shown as 16 squares, with four sampling points located on the boundary of each square, at the four corners of each square). In examples such as this, different regions may share sampling points in common. For example, a first sampling point 136*d* of the region 138 is shared between the region 138 and the three regions neighbouring the region 138, above, to the top left and to the left of the region 138 in FIG. 6. In other examples, though, the sampling points of the region may not be shared with other regions. Furthermore, while in FIG. 6, the predetermined regions are non-overlapping and are uniform in shape and size, in other examples the predetermined regions may be partially overlapping and may be non-uniform in shape and/or size.

The region containing the point may be identified based on a predetermined relationship between a location of sampling points corresponding to a boundary of the region and a location of the point at which interpolation is to be performed. For example, the sampling points corresponding to the boundary of the region may be selected as the m nearest neighbours of the point, where m is an integer and may be a predefined number. For example, where the region is a 2-dimensional region (as shown in FIG. 6), m is four and the region has the shape of a square. This may be extended to an increasing number of dimensions. For example, where the region is a 3-dimensional region, m is eight and the region has the shape of a cube (or a rectangular cuboid). In examples, the region is an n-dimensional region, each dimension of the n-dimensional region corresponding to a different respective colour channel of n colour channels, where n is an integer.

A respective location of each sampling point illustrated in FIG. 6, for example within the initial coordinate system 134, may be represented by sampling location data. Similarly, a location of the point 132 within the initial coordinate system 134 may be represented by location data. A determination as to whether the point 132 is located within a particular region of the colour space may be made based on at least one significant bit of the location data representing the location of the point 132. With reference to FIG. 6, a first sampling point 136a is located at (1, 3), a second sampling point 136b is located at (2, 3), a third sampling point 136c is located at (2, 2) and a fourth sampling point 136d is located at (1, 2) in the initial coordinate system 134. The point 132 is located at (1.6, 2.3) in the initial coordinate system 134. The most significant bit of the sampling location data representative of the location of the sampling points 136 and the location data representative of the location of point 132 for example represents the integer part of these locations. The integer parts of the location of the point 132 in this case are 1 (for the x-coordinate) and 2 (for the y-coordinate). The point 132 may therefore be considered to be located in the region that extends from this coordinate. In this case, as the predetermined shape of the region 138 is a square (in two dimensions), the origin of the region for the interpolation may be taken as (1, 2) and the other sampling points for use in the interpolation may be taken as the three points that correspond to (x+1, y), (x+1, y+1) and (x, y+1), to form a unit square surrounding the point 132. The region 138 for the interpolation in this example may thus be identified.

In this instance, the locations of the sampling points may be considered to be normalized with respect to the initial coordinate system 134. For example, each sampling point may be considered to correspond to an integer coordinate value in the initial coordinate system 134. However, in other examples, the locations of the sampling points may not be normalized with respect to the initial coordinate system 134.

After the region 138 has been identified, a distance between a location of the point 132 in the region 138 and an origin of the region 138 (which in this example corresponds with the fourth sampling point 136d) may be calculated, to generate initial distance data representative of an initial distance between the location of the point 132 and the fourth sampling point 136d in the initial coordinate system 134. The initial distance in the x-direction, corresponding to the red coordinate (illustrated as dR in FIG. 6), may be calculated by subtracting the location of the fourth sampling point 136d from the location of the point 132 in the x-direction of the initial coordinate system i.e. by subtracting 1 from 1.6, to get dR=0.6. Similarly, the initial distance in the y-direction, corresponding to the green coordinate (illustrated as dG in FIG. 6), may be calculated by subtracting the location of the fourth sampling point 136d from the location of the point 132 in the y-direction of the initial coordinate system i.e. by subtracting 2.3 from 2, to get dG=0.3. A similar method may be used to obtain initial distance data representative of an initial distance in a z-direction, for example corresponding to a blue coordinate, dB.

In examples, the transform data includes a first set of transform data associated with a first at least one sampling point of the plurality of sampling points and a second set of transform data associated with a second at least one sampling point of the plurality of the sampling points. In such examples, the method may involve retrieving the first set of transform data from first storage and retrieving the second set of transform data from second storage different from the first storage. This for example allows the first and second sets of transform data to be retrieved at the same time or simultaneously with each other, from different storages. This may improve the efficiency of the method and reduce latency that would be introduced otherwise, for example if the first and second sets of transform data were retrieved sequentially from the same storage.

In other examples, the transform data may include a plurality of sets of transform data, each associated with a respective sampling point of the plurality of sampling points. In such examples, each set of transform data may be retrieved from a different respective storage. For example, where the sampling points are located on a boundary of a three dimensional region having the shape of a cube, there may be 8 sampling points, each located at a corner of the cube. In this example, there may be 8 different storages and transform data associated with each of the 8 sampling points may be stored in a different respective storage of the 8 storages. The transform data for each of the 8 sampling points may then be retrieved from all 8 storages at the same time or simultaneously.

The transform data is associated with a plurality of sampling points, in this case the plurality of sampling points that are located on the boundary of the region 138, i.e. the sampling points 136 illustrated in FIG. 6. The transform data may be considered to correspond to a mapping or transformation between values, or to coefficients or functions for performing such a mapping. In the example of FIGS. 5 to 8, the mapping is between RGB values in a first colour space (which is the Rec. 2020 colour space) and corresponding values in a second, different, colour space (which is the DCI-P3 colour space in this example). Thus, for an RGB value that is associated with a sampling point, a corresponding Rec. 2020 value may be obtained directly from the transform data. However, for an RGB value that is associated with a point other than a sampling point (such as the point 132 of FIG. 6), an interpolation may instead be used to calculate a corresponding DCI-P3 value based on a weighted combination of transform data associated with sampling points that surround or are nearby to the point 132.

In this example, the transform data associated with the sampling points 136a, 136b, 136c, 136d that were identified as being located on the boundary of the region 138 is retrieved from the storage 144. To retrieve the transform data, the image data 130 is transferred to an address generator module 142 to identify the addresses in the storage 144 in which the transform data associated with the sampling points located on the boundary of the region 138 is stored. The storage 144 may for example be an on-chip memory or buffer of a system or apparatus for implementing the methods described herein. For example, the storage may be or include at least one of volatile memory, such as a Random Access Memory (RAM), for example Static RAM (SRAM), Dynamic RAM (DRAM) or an embedded Dynamic Random Access Memory (eDRAM) or non-volatile memory, such as Read Only Memory (ROM). The storage may also or alternatively be implemented as a register file, which is typically an array of processor registers in a CPU. For example, the transform data may be stored in a LUT of the storage 144 and retrieved based on the location of the sampling points 136 (for example as converted to addresses by the address generator 142). For example, a typical LUT for colour management or colour enhancement may be a 9×9×9 3D LUT, which therefore includes transform data associated with 729 sampling points.

The addresses may be calculated by the address generator module 142 based on at least one most significant bit of location data representative of a location of the point 132 at which an interpolated data value is to be calculated. For example, if an image, I, can be represented as a three dimensional array of pixels, then the pixel value for a pixel located at location (x, y) (which may be taken to correspond with the point 132 illustrated in FIG. 6) can be denoted I(x, y)=[R, G, B], where [R, G, B] represent red, green and blue floating point intensity values for red, green and blue colour channels respectively, on a scale from 0 to 1. In such an example, a 3D LUT storing the transform data may be of a size 9×9×9 (×3 for the three colour channels). To find LUT locations corresponding to the sampling points located on a boundary of the region including the point 132 a LUT location corresponding to origin of the region (such as a leftmost and lowermost corner of the region, as shown in FIG. 6, corresponding to the fourth sampling point 136d) may first be determined. This may be calculated, for example, as $LUT_{136d}$=[f (R*8), f (G*8), f (B*8)], where $LUT_{136d}$ indicates the LUT location of the transform data corresponding to the fourth sampling point 136d, f(x) indicates the floor of x, which may be taken as the integer part of x. For example, f(1.1)=f(1.8)=1. Where a size of the LUT is (2 to the power of m) plus 1 (e.g. 9, 17, 33 etc.), where the size is for example the size of the largest dimension of the LUT, the floor of x may be calculated from the most significant bit or bits of x. Otherwise, the floor of x may be calculated directly from the pixel value of x. So, for the pixel [0.0, 0.5, 0.9] (where the values are normalized to a value between 0 and 1 rather than covering a larger range, such as a range from 0 to 255, as in an 8-bit representation), the transform data corresponding to the fourth sampling point 136d will be stored at LUT location [0, 4, 7] (as LUT indices typically start from 0). The LUT locations of the first, second and third sampling points 136a, 136b, 136c may then be calculated relative to the LUT location of the fourth sampling point 136d. The address generator module 142 may then be used to convert these LUT locations into addresses, which may correspond to addresses in different storages (as described above), or to addresses in the same storage (for example if a register file is used). It is to be appreciated, though, that the above formula for determining $LUT_{136d}$ is specific to an example in which the 3D LUT storing the transform data is of the size 9×9×9. In more general examples, in which the 3D LUT storing the transform data is of the size a×b×c, the $LUT_o$=[f (R*(a−1)), f (G*(b−1), f (B*(c−1))], where $LUT_o$ is the LUT location of the transform data corresponding to a sampling point which may be taken as the origin of the region on whose boundary the sampling points lie.

In the example of FIG. 6, the point 132 is located at (1.6, 2.3) in a two dimensional coordinate system. In other words, the point 132 corresponds to a value within a larger range than the example above (in which the intensity values for the red, green and blue colour channels are from 0 to 1), as the location of the point 132 in this example is not normalized to value between 0 and 1. However, it will be appreciated that a LUT location for the first, second, third and fourth sampling points 136a, 136b, 136c, 136d for this case may be calculated similarly, for example by scaling or normalizing the location of the point 132 to a scale from 0 to 1 before calculating the LUT location of the transform data corresponding to the first, second, third and fourth sampling points 136a, 136b, 136c, 136d.

The transform data is transferred to an upscaler module 146, which upscales the transform data. For example, the upscaling of the transform data may include increasing a bit precision of the transform data. The bit precision of the transform data may be increased by adding zeros to the least significant bits of the transform data. This may help to maintain a precision of the transform data during further processing, improving the bit precision of the interpolated data value.

The transform data is subsequently transferred to a first pre-interpolation stage 148a, along with the initial distance data 140a, 140b, 140c. It is to be noted that the first pre-interpolation stage 148a may be referred to as a pre-interpolation stage as it may be performed before interpolation of the image data to generate the interpolated data value. However, the pre-interpolation stage may itself involve other interpolation processes, such as an interpolation process to generate additional location data and/or to generate additional transform data. The first pre-interpolation stage 148a is illustrated schematically in FIGS. 7 and 8.

Figure 7:
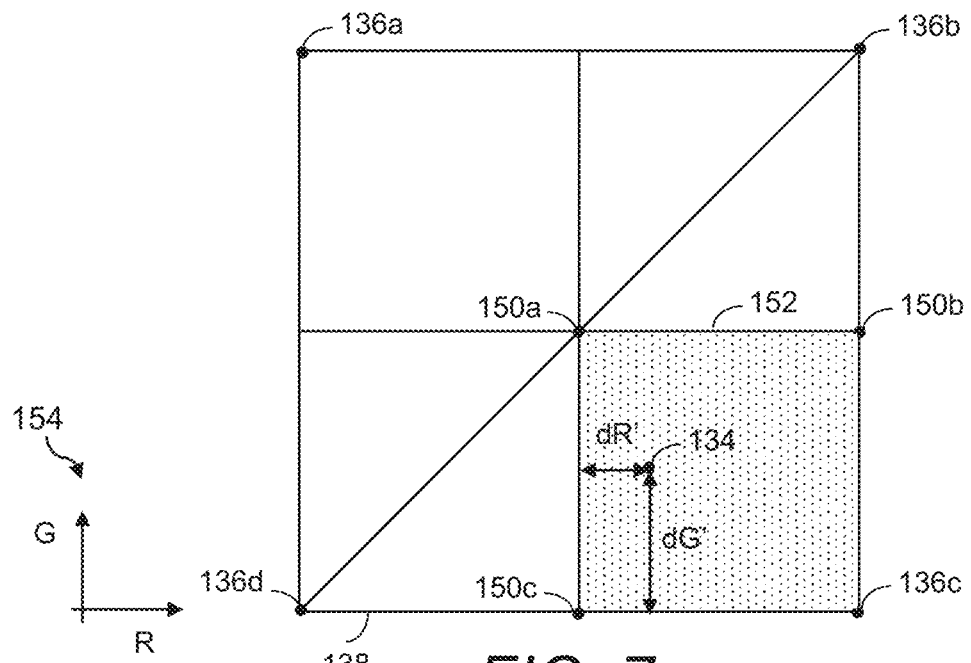
FIG. 7 illustrates schematically an example of generating additional image data.
Figure 8:
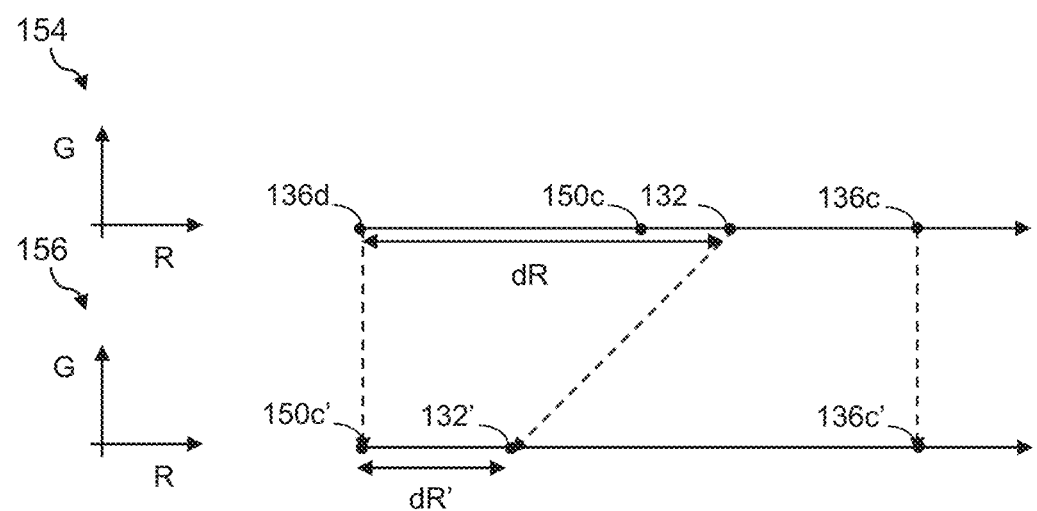
FIG. 8 illustrates schematically an example of renormalizing a coordinate system.

The pre-interpolation stage of FIGS. 7 and 8 involves obtaining the transform data associated with the plurality of sampling points. In this example, the transform data is obtained from the storage 144, which is for example storage of an apparatus configured to perform the interpolation method described herein. However, in other examples, the transform data may be received from an external source or from a different component of an apparatus for performing the interpolation method than the up scaler module 146. For example, obtaining the transform data may be considered to encompass either active retrieval of the transform data or passive receipt of the transform data from an external module or as an output of a process internal to the component in which the transform data is obtained.

The transform data in the methods of FIGS. 7 and 8 is processed to generate additional transform data associated with an additional sampling point 150a located on a boundary of a subregion 152 of the region 138. The generation of the additional transform data may first involve generating additional location data representative of a location of the additional sampling point 150a.

The location of the additional sampling point 150a may be generated from at least one of the plurality of sampling points 136, for example using a predefined relationship or formula. In this example, a location of the additional sampling point 150a with respect to an axis of a coordinate system corresponds to a location of a sampling point 134 with respect to the axis of the coordinate system divided by two.

In examples, the additional sampling point 150a may lie on a diagonal of the coordinate system, which in this example corresponds to a line of constant G/R (i.e. a constant ratio of green data values to red data values, as the x-axis corresponds to red data values and the y-axis corresponds to green data values). In cases in which the additional sampling point lies on a contour of a constant image data value, such as a constant ratio between values of two different colour channels, the additional sampling point may be chosen to ensure consistency of colours along brightness changes. For example, an interpolation direction for calculating a location of the additional sampling point may be selected to maintain a consistency of an image data value, such as an image colour, for changing brightness values. In such cases, the additional sampling point may lie along this interpolation direction, or the boundary of the subregion may at least partly coincide with, meet, or cross, this interpolation direction.

The locations of the additional sampling point 150a and the sampling point 134 may be expressed in the same coordinate system as that used for determining the initial distance data (the initial coordinate system 134). However, in the example of FIG. 7, the initial coordinate system 134 has been renormalized to a first coordinate system 154, with the fourth sampling point 136d (which may be considered to correspond to an origin of the region 138) renormalized to correspond to the origin of the first coordinate system 154. Thus, in this example, the renormalization of the initial coordinate system involves reducing all x-coordinates expressed in the initial coordinate system 134 by 1 and reducing all y-coordinates expressed in the initial coordinate system 134 by 2. Thus, after renormalization, the first sampling point 136a is located at (0, 1), the second sampling point 136b is located at (1, 1), the third sampling point 136c is located at (1, 0) and the fourth sampling point 136d is located at (0, 0) in the first coordinate system 154. The additional sampling point 150a is located at (0.6, 0.3) in the first coordinate system 154.

Methods in accordance with FIG. 7 may involve applying a bit shift operation to sampling location data representative of the location of the sampling point to generate additional location data representative of the location of the additional sampling point. A bit shift operation for example involves operating on a bit pattern representing the location of the sampling point (for example by operating on the sampling location data represented as a binary numeral) at the level of individual bits. For example, a division by a factor of two can be implemented by moving the series of bits representative of the sampling location by one or more positions. As a simple example, if the location of the sampling point may be represented in binary by 11 (i.e. the number 4 in decimal), a bit shift of 1 to the right can be used to obtain the binary numeral 01 (i.e. the number 2 in decimal), thereby dividing the location of the sampling point by two to obtain an additional sampling point at this new location. Such a bit shift operation can be used to divide the location of the sampling point by a factor of two in a hardware efficient manner, as a bit shift operation can typically be performed more rapidly by a processor than other types of operation such as divisions that cannot be performed by a bit shift operation. References herein to division by a factor of two are to be taken as referring to division by two or by a factor of 2n, where n is an integer.

In examples such as this, processing of the sampling location data to generate the additional location data may involve reducing a bit precision of the location data. For example, where a bit shift operation is applied to the sampling location data to shift the bits representative of the location of the sampling point by one place to the right, the additional location data may have a bit precision of one less than the bit precision of the sampling location data. For example, such a bit shift operation may involve shifting the sampling location data by one bit to the right, discarding the least significant bit (the rightmost bit, that is shifted out of the rightmost end of the sampling location data) and introducing a zero as the new leftmost bit. This may be considered to correspond to a logical shift of the sampling location data (although an arithmetic shift, in which the sign of the operand is preserved, may be used in other examples).

The additional transform data in this example is associated with an additional sampling point that is located on the boundary of a subregion 152 of the region 150. The region may correspond to a first polyhedron and the subregion may correspond to a second polyhedron, which is for example of a different shape or size then the first polyhedron. For example, the first polyhedron may be a first cube and the second polyhedron may be a second cube smaller than the first cube. FIG. 7 shows such an example: in FIG. 7, the subregion 152 corresponds to a quadrant of the region 138 and both the subregion and the region 152, 138 can be illustrated in 2D as squares in 2D (or as cubes in 3D). However, in other examples, one or both of the region and the subregion may have an irregular shape or the region may extend across more dimensions than two. For example, the region may be a three-dimensional polyhedron.

For example, the first polyhedron may be a first cuboid and the second polyhedron may be a second cuboid smaller than the first cuboid. For example, the second cuboid may correspond to a scaled-down version of the first cuboid, with the same shape as the first cuboid but reduced in size. A cuboid may be a rectangular cuboid in which some or all of the faces of the cuboid is a rectangle rather than a square. Alternatively, a cuboid may be a square cuboid, in which each of the faces of the cuboid is a square. In such cases, a 3D LUT including transform data associated with sampling points may have a different size for different dimensions. For example, the 3D LUT may store transform data for a larger number of sampling points in one dimension than a different dimension.

The boundary of the subregion may be partially coincident with the boundary of the region. In other words, the subregion and the region may have a partially shared boundary or boundary portion. FIG. 7 shows such an example. In other examples, though, the subregion and the region may not share a boundary. For example, the subregion may be entirely surrounded by the region.

A determination of which additional sampling points are to be generated may be made similarly to the selection of sampling points 136 from storage, as described with reference to FIG. 6. For example, the region 138 may be divisible into a plurality of predetermined subregions including the subregion 152. The method in such cases may involve processing location data representative of the location of the point 132 to determine that the point 132 is located within the subregion 152. For example, the location data may be processed to determine that the point 132 is located within the subregion 152 on the basis of at least one most significant bit of the location data. For example, there may be a predetermined relationship between the region and the subregions. In this case, each subregion corresponds with a quadrant of the region; in other words, the region may be divided into four equal-sized squares to obtain the subregions. Based on this relationship between the region and the subregions, the subregion in which the point 132 is located can be determined, similarly to determining in which region the point 132 is located as described above with reference to FIG. 6.

Once the subregion in which the point 132 is located has been determined, the location of the additional sampling points can be generated. This determination may be performed for example by processing sampling location data representative of a respective location of each of at least one of the plurality of sampling points 136 to calculate a location of the additional sampling point 150a on the boundary of the subregion 152, thereby generating additional location data representative of the location of the additional sampling point 150a. The generation of the additional location data may be based on a predetermined relationship between the sampling points and the additional sampling point or points, which may be the same as the predetermined relationship between the region and the subregions. For example, in this case, four additional sampling points 150 are generated, based on the following relationships between the locations of the additional sampling points 150 and the locations of the sampling points 136:

$$P_{150a} = \frac{(P_{136b} + P_{136d})}{2}$$

$$P_{150b} = \frac{(P_{136b} + P_{136c})}{2}$$

$$P_{150c} = \frac{(P_{136c} + P_{136d})}{2}$$

where $P_x$ indicates the location of point x in the first coordinate system 154. As can be seen from FIG. 7, the location of the third sampling point 136c remains unchanged in this process. Thus, the locations of the additional sampling points may be calculated as an average of the locations of a plurality (in this case, two) sampling points. It is to be appreciated, though, that the above formulae for $P_{150a}$, $P_{150b}$ and $P_{150c}$ are for a two dimensional example, such as that shown in FIG. 7. However, in other examples in which the region has a larger number of dimensions, the locations of the additional sampling points may be calculated similarly. For example, where the region is a three-dimensional region, seven additional sampling points may be calculated rather than three. These seven additional sampling points may include the additional sampling points $P_{150a}$, $P_{150b}$ and $P_{150c}$ for the two dimensional cases, as well as four additional sampling points corresponding to these additional sampling points $P_{150a}$, $P_{150b}$ and $P_{150c}$ and the third sampling point 136c but in a plane parallel to a first plane including the additional sampling points $P_{150a}$, $P_{150b}$ and $P_{150c}$ and the third sampling point 136c (for example midway between the first plane and a second plane including other sampling points of the three-dimensional region).

As will be appreciated, if the point 134 is located in other quadrants or subregions of the region 138, different (but similar) relationships between the locations of additional sampling points to be generated and the locations of the sampling points 136 may be used to generate the locations additional sampling points. In general, where the region 138 is a square (as in FIG. 7), the sampling point closest to the point 134 remains unchanged (and is located on the boundary of the subregion). However, the location of two of the additional sampling points may be calculated as the average between the location of the sampling point closest to the point 134 and each of the other sampling points that neighbour the closest sampling point and the location of a further additional sampling point may be calculated as the average between the locations of the other sampling points that neighbour the closest sampling point. For example, if the point 134 is located in the upper left quadrant of the region 138 as shown in FIG. 7, the closest sampling point to the point 134 is the first sampling point 136a. The locations of two of the additional sampling points may then be calculated as the average between the location of the first sampling point 136a and each of the two sampling points neighbouring the first sampling point 136a i.e. as ½($P_{136a}$+$P_{136b}$), ½($P_{136a}$+$P_{136d}$) and the location of a further additional sampling point may be calculated as the average between the two sampling points neighbouring the first sampling point 136a, i.e. as ½($P_{136b}$+$P_{136d}$).

After generation of the additional sampling points, the additional transform data may then be calculated. The additional transform data may be calculated based on the transform data associated with the sampling points 136 using a similar method to the generation of the locations of the additional sampling points. For example, the transform data may be processed using location data representative of a respective location of at least some of the plurality of sampling points to generate the additional transform data. For example, at least one coefficient represented by the transform data may be weight using the location data, for example to account for a contribution to the additional transform data from transform data associated with two or more neighbouring sampling points.

The additional transform data may be calculated for solely one additional sampling point or a plurality of additional sampling points. FIG. 7 shows an example in which additional transform data is calculated for each of a plurality of additional sampling points 150a, 150b, 150c. Each of the additional sampling points (which may be referred to collectively with the reference numeral 150) in this example lies on the boundary of the subregion 152. As will be appreciated, though, this is merely an illustrative relationship, and in other examples, the relationship between the additional sampling points and the sampling points may be different or more or fewer additional sampling points may be generated for a given number of sampling points.

As noted above, the additional transform data may be calculated using a first interpolation process, which may be similar to the calculation of the additional location data. For example, the additional transform data associated with the additional sampling points 150a, 150b, 150c may be calculated as:

$$T_{150a} = \frac{(T_{136b} + T_{136d})}{2}$$

$$T_{150b} = \frac{(T_{136b} + T_{136c})}{2}$$

$$T_{150c} = \frac{(T_{136c} + T_{136d})}{2}$$

where $T_x$ indicates a transformation (such as a coefficient for implementing a transformation) associated with a point x in the first coordinate system 154. The transform associated with the third sampling point 136c remains unchanged in this example.

The transform data may have a given transform data width, which is typically smaller than an image data width of the image data. However, the processing of the transform data to generate the additional transform data may increase the bit precision or width of the additional transform data relative to the transform data.

The output of the first pre-interpolation stage may therefore be the additional transform data for use in an interpolation process. The first pre-interpolation stage may also output recalculated distance data that represents a recalculated distance between the point and an origin or extremity of the subregion 152. This distance data may then be used in a subsequent interpolation process. An example of generation of this distance data is shown schematically in FIG. 8.

The distance data in examples such as FIG. 8 may be calculated by processing the additional location data representative of the location of the additional sampling point and location data representative of the location of the point. The distance data may be calculated in a similar way to the calculation of the initial distance data. For example, the distance between the location of the point and the location of the additional sampling point in the x-direction may be calculated by subtracting the location of the additional sampling point from the location of the point in the x-direction. Similarly, the distance between the location of the point and the location of the additional sampling point in the y-direction may be calculated by subtracting the location of the additional sampling point from the location of the point in the y-direction. As will be appreciated, the x-axis in the example of FIG. 8 is used to represent red data values and the y-axis is used to represent green data values. In other words, the distances referred to herein are distances in a colour space (in this example, the Rec. 2020 colour space), as represented in a coordinate system spanning the colour space, for example with each dimension corresponding to a different colour of the colour space. Thus, the distance data may be considered to represent a distance, in the colour space, between the point and the additional sampling point, rather than a pixel location in an image.

The distance data may be calculated in a renormalized coordinate system, which may be renormalized similarly to the renormalization of the initial coordinate system 134. In such cases, the methods described herein may involve renormalizing a coordinate system for representing a location of the point 132 at which a value is to be interpolated. FIG. 8 shows such an example schematically.

In examples in accordance with FIG. 8, the image data (which for example represents a location of the point 132 in the first coordinate system 154) may be considered to be first image data. The first image data may be processed to generate second image data representative of the location of the point 132 in a second coordinate system 156 different from the first coordinate system 154. For example, a sampling point (in this example the fourth sampling point 136*d*) may correspond to an origin of the first coordinate system 154 and an additional sampling point (in this example the additional sampling point 150*c*) may correspond to an origin of the second coordinate system 156. For example, in the second coordinate system 156, there may be a plurality of boundary points located on the boundary of the subregion 152 which may include the additional sampling point. For example, the plurality of boundary points may include the additional sampling points 150*a*, 150*b*, 150*c*, as well as the third sampling point 136*c*, in the example of FIGS. 7 and 8. In examples such as this, the method may involve renormalizing the second coordinate system 156 such that there is a predetermined distance between neighbouring boundary points. For example, the predetermined distance may be equal to two to the power of a bit width of the image data, to preserve the precision of the image data. This may further preserve the precision of the interpolated image data. As part of such a renormalization process, the distances in the x, y and z directions (for example corresponding to red, green and blue difference values, which may be expressed as dR, dG, dB) may therefore be normalized too, to calculate normalized values of dR, dG, dB (illustrated as dR', dG', dB' in FIGS. 7 and 8) with respect to the second coordinate system 156 rather than the first coordinate system 154. For example, the point 132 may be located at a value of dR=0.6 from the origin of the first coordinate system 154 in the x-direction. However, after renormalizing the coordinate system for representing the location of the point 132, the point 132' may be located at a value of dR'=0.2 from the origin of the second coordinate system 156 in the x-direction. As can be seen from FIGS. 7 and 8, locations in the second coordinate system 156 are labelled with the same references as corresponding locations in the first coordinate system 154, but appended by an apostrophe.

The distance data, which may be normalized as described above, may be used subsequently as an input to an interpolation process, for example alongside or in addition to the additional transform data.

Referring back to FIG. 5, the method of FIG. 5 involves a plurality of pre-interpolation processes 148 including a first pre-interpolation stage 148*a*, a second pre-interpolation stage 148*b* and a third pre-interpolation stage 148*c*. In examples such as this, an output of each successive intermediate pre-interpolation process may be used as an input to a subsequent pre-interpolation process. For example, each of the pre-interpolation processes may include processing previous additional transform data associated with a previous additional sampling point of a previous pre-interpolation process to generate subsequent additional transform data associated with a subsequent additional sampling point located on a boundary of a subsequent subregion. In such cases, the subsequent subregion may be a subregion of a previous subregion, the previous additional sampling point of the previous pre-interpolation process located on a boundary of the previous subregion. For example, the output of the first pre-interpolation stage 148*a* may be used as an input to the second pre-interpolation stage 148*b*, which may be further decrease the size a region used for a subsequent interpolation process to a subregion of the subregion 152 output from the first pre-interpolation stage 148*a*. Similarly, the output of the second pre-interpolation stage 148*b* may be used as an input to the third pre-interpolation stage 148*c*, which may additionally decrease the size of a region used for a subsequent interpolation process to a subregion of a subregion output by the second pre-interpolation stage 148*b*. Thus, increasing the number of pre-interpolation processes or stages may incrementally increase the accuracy of the interpolated data value obtained by the interpolation process. It will be appreciated, though, that in some cases there may be solely one pre-interpolation stage.

Finally, the output of the pre-interpolation stage 148 is output to an interpolation process 150, which in the example of FIG. 5 is a trilinear interpolation process. For example, the interpolation process may be a second interpolation process different from a first interpolation process for generating the additional transform data. Such an interpolation process may be used for transforming colour channel data to a second colour space different from a first colour space (such as from the Rec. 2020 colour space to the DCI-P3 colour space in the example of FIGS. 5 to 8).

The interpolation process 150 includes processing the image data associated with the point 132 with the additional transform data generated by the pre-interpolation stage 148, thereby generating interpolated image data representative of an interpolated data value at the point 132. For example, the image data may be processed with the additional transform data and at least a portion of the transform data, for example the transform data associated with a sampling point that lies on a boundary of the subregion output by the pre-interpolation stage 148. FIG. 7 shows such an example. In FIG. 7, the transform data associated with the third sampling point 136*c* is processed with the additional transform data associated with the first, second and third additional sampling points 150*a*, 150*b*, 150*c*.

Figure 9:
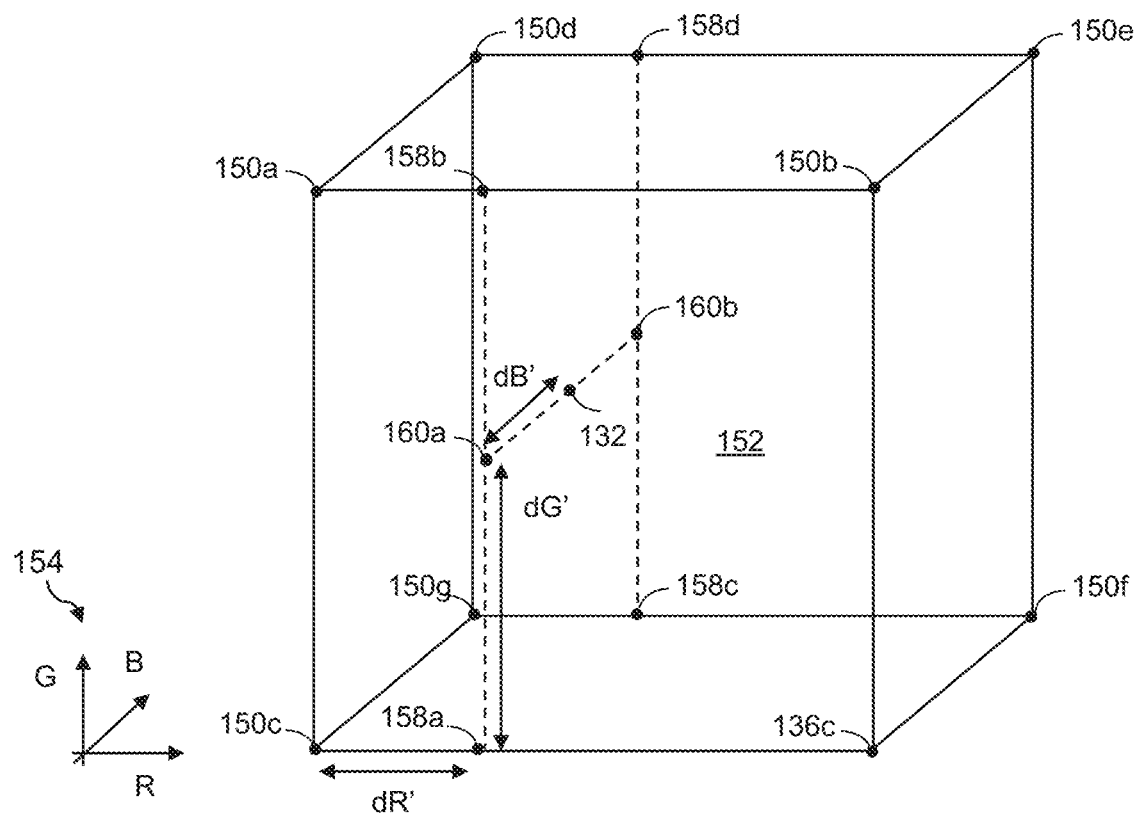
FIG. 9 illustrates schematically an example of a trilinear interpolation process.
Figure 10C:
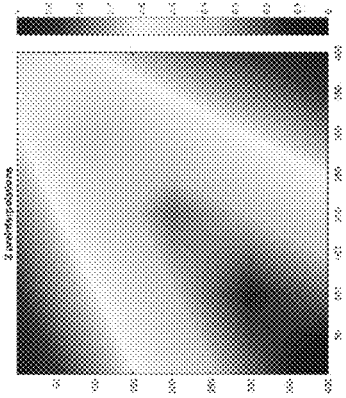
FIGS. 10a-10f show 2 dimensional contour graphs illustrating outputs of an example method of image data interpolation.
Figure 10F:
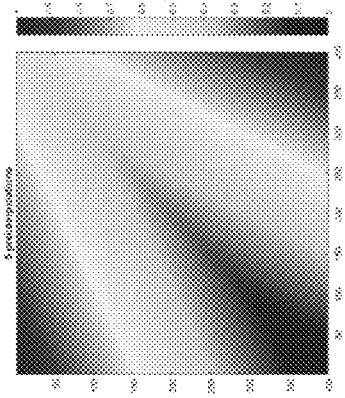
Figure 10B:
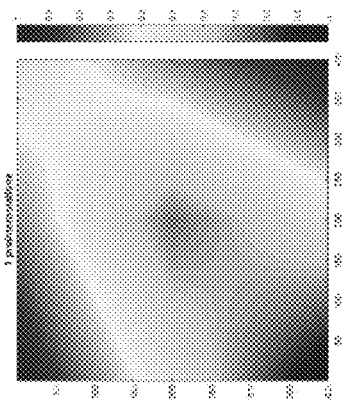
Figure 10E:
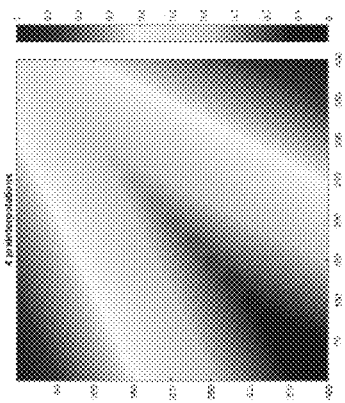
Figure 10A:
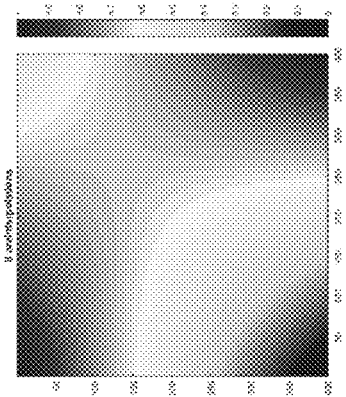
Figure 10D:
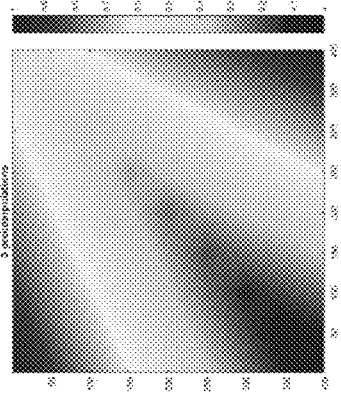

An example of trilinear interpolation is shown in FIG. 9. FIG. 9 shows trilinear interpolation within the subregion 152 shown in FIG. 7, but in 3 dimensions. The additional transform data in this example is associated with additional sampling points 150*a*, 150*b*, 150*c*, 150*d*, 150*e*, 150*f*, 150*g*. The transform data associated with the sampling point 136*c* is also used for the trilinear interpolation in this example.

Distance data representative of the distance between the origin of the second coordinate system 154 (which in this example coincides with the third additional sampling point 150*c*) in each of the coordinates of the second coordinate system and the point 132 at which a data value is to be interpolated is also used in the interpolation. These distances are labelled in FIG. 9 as dR', dG' and dB' (which are the same as dR, dG, dB described above, but in the second coordinate system 154).

Trilinear interpolation is typically done in three dimensions: four 1 dimensional interpolations are done along the x-axis (which in this case corresponds to red data values); two 1 dimensional interpolations are done along the y-axis (which in this case corresponds to green data values). The four 1 dimensional interpolations along the x-axis may be used to generate interpolated transform values or coefficients at points indicated as 158*a*, 158*b*, 158*c*, 158*d* in FIG. 9:

$$T_{158a} = T_{150c}(dR') + T_{136c}(1-dR')$$

$$T_{158b} = T_{150g}(dR') + T_{150f}(1-dR')$$

$$T_{158c} = T_{150a}(dR') + T_{150b}(1-dR')$$

$$T_{158d} = T_{150d}(dR') + T_{150e}(1-dR')$$

where $T_x$ indicates a transformation (such as a coefficient for implementing a transformation) associated with a point x in the second coordinate system 154.

The two 1 dimensional interpolations along the y-axis may be used to generate interpolated transform values or coefficient at points indicated as 160*a*, 160*b* in FIG. 9:

$$T_{160a} = T_{158a}(dG') + T_{158b}(1-dG')$$

$$T_{160b} = T_{158c}(dG) + T_{158d}(1-dG')$$

Finally, a one dimensional interpolation may be performed along the z-axis to generated an interpolated transform value or coefficient at the point 132, where:

$$T_{132} = T_{160a}(dB') + T_{160b}(1-dG')$$

The interpolations along each of the axes may be performed in any order. Moreover, each one dimensional interpolation may be performed by calculating $T = T_1 + d(T_2 - T_1)$ instead of $T = T_1(1-d) + T_2 d$.

For example, the interpolations may instead be performed as:

$$T_{158a} = T_{136c} + dR'(T_{150c} - T_{136c})$$

$$T_{158b} = T_{150f} + dR'(T_{150g} - T_{150f})$$

$$T_{158c} = T_{150b} + dR'(T_{150a} - T_{150b})$$

$$T_{158d} = T_{150e} + dR'(T_{150d} - T_{150e})$$

$$T_{160a} = T_{158b} + dG'(T_{158a} - T_{158b})$$

$$T_{160b} = T_{158d} + dG(T_{158c} - T_{158d})$$

$$T_{132} = T_{160b} + dG'(T_{160a} - T_{160b})$$

This may be more efficient, by reducing the number of multipliers. In examples such as this, a bit precision or bit depth of a difference between two transform coefficient may be equal to the bit precision of the image data minus the number of pre-interpolation stages plus 3 to perform exact calculations. Transform coefficients may however be truncated at a bit precision equal to the bit precision of the image data plus two at each pre-interpolation stage, which may result in 1 extra bit when a difference between two transform coefficients is calculated. To avoid this, a maximal difference between two transform coefficients may be limited so as not to exceed two to the power of three times (the bit precision of the transform data or the additional transform data plus 2).

Typically, transform coefficients, which may be represented by the transform data (or the additional transform data for additional sampling points), may have a value of between 0 and 1 in floating point arithmetic, for example for transformations for colour enhancement. Other ranges are possible in other examples, though. For example, for colour space conversions, the transform coefficients may take negative values or values larger than 1. Typically, transform coefficients may take a value of between −2 and 2 in floating point arithmetic for colour space conversions.

In cases in which transform coefficients have a value of between 0 and 1 in floating point arithmetic (such as for colour enhancement), the transform coefficients may have a value of between 0 and two to the power of (the bit precision of the transform data or the additional transform data) in fixed point arithmetic. In cases where the coefficient range is higher, such as colour space conversion, additional bits may be used. A typical range for colour space conversion could be from −2 to 2 in floating point arithmetic or minus two and two to the power of (the bit precision of the transform data or the additional transform data). These values are typically stored in two's complement and require (the bit precision of the transform data or the additional transform data plus two bits). Thus, typically, the transform coefficients do not exceed the limits set out above.

In other examples, different interpolation processes may be performed to calculate the interpolated transform value. For example, trilinear interpolation may be performed without 1 dimensional interpolations, although this is generally less efficient than the processes described above. In such cases, the interpolated transform value T may be calculated as:

$$T = T_{150c}(1-dR')(1-dG')(1-dB') +$$

$$T_{136c}(dR')(1-dG')(1-dB') +$$

$$T_{150f}(dR')(1-dG')(dB') +$$

$$T_{150g}(1-dR')(1-dG')(dB') +$$

$$T_{150a}(1-dR')(dG')(1-dB') +$$

$$T_{150b}(dR')(dG')(1-dB') +$$

$$T_{150e}(dR')(dG')(dB') +$$

$$T_{150d}(1-dR')(dG')(dB')$$

The interpolated transform value calculated for the point 132 may then be used to process the image data corresponding to the point 132, to transform the point 132 according to the transformation represented by the interpolated transform value, to generate an interpolated data value corresponding to the point 132. The interpolated data value may for example correspond to a colour in a colour space. For example, in the case of FIGS. 5 to 9, the interpolated data value corresponds to a colour in the DCI-P3 colour space (which has been converted from the Rec. 2020 colour space by transforming the image data 130 from the REC. 2020 colour space using the interpolated transform value). However, in other examples, the interpolated data value may instead correspond with a colour value in a colour space, such as a colour value corresponding to a colour channel rather than a plurality of colour channels. For example, the interpolated data value may correspond to a Y value (rather than a YUV value) in the YUV colour space, which has for example been converted from the RGB colour space.

Example two dimensional contour graphs showing outputs of an example method of image data interpolation similar to those described herein are shown in FIG. 10. These graphs illustrate interpolation of image data in two dimensions. The number of pre-interpolation stages increases from the FIG. 10a to FIG. 10f. As can be seen by comparing FIGS. 10a to 10f, the image quality increases as the number of pre-interpolation stages increases. For example, by increasing the number of pre-interpolation stages, colour consistency is increased in a direction of changing brightness.

The above examples are to be understood as illustrative examples. Further examples are envisaged. For example, it is to be understood that the image signal processing pipeline 112 of FIG. 3 is merely illustrative and that other image signal processing pipelines may include different features or may omit some of the features shown in FIG. 3. Furthermore, the order of the processes of the image signal processing pipeline 112 of FIG. 3 may be different in other image signal processing pipelines.

The example of FIG. 9 includes trilinear interpolation for the interpolation process using the additional transform data. However, in other examples, the additional transform data may be interpolated using a different interpolation process.

Further examples relate to an apparatus configured to perform the methods described herein. Such an apparatus may include storage for storing the transform data, which may for example include a LUT for storing the transform data, and a processor communicatively coupled to the storage. As explained above, the storage may be or include at least one of volatile memory, such as a Random Access Memory (RAM), for example Static RAM (SRAM), Dynamic RAM (DRAM) or an embedded Dynamic Random Access Memory (eDRAM) or non-volatile memory, such as Read Only Memory (ROM). Alternatively or additionally, the storage may include a register file, which may be a non-volatile memory. The storage may store data or instructions for controlling the apparatus, for example components or subsystems of the apparatus, to perform the methods described herein. Such data may for example be in the form of computer readable and/or executable instructions, for example computer program instructions. As will be appreciated, though, in other examples the apparatus may be configured to perform the methods described herein via a particular, predefined hardware configuration or by a combination of hardware and software. The processor may include a microprocessor, a general purpose processor, a digital signal processor (DSP), an application specific integrated circuit (ASIC), a field programmable gate array (FPGA), a graphics processor or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The components of such an apparatus may be interconnected using a systems bus, to allow data to be transferred between the components. The apparatus may for example be or include a computing device. For example, the apparatus may be or comprise an image signal processor (such as that described above). The apparatus may be or comprise a system-on-a-chip. For example, the apparatus may be a self-contained, pre-programmed chip, which can be integrated with, coupled with or connected to other electronic components.

Figure 11:
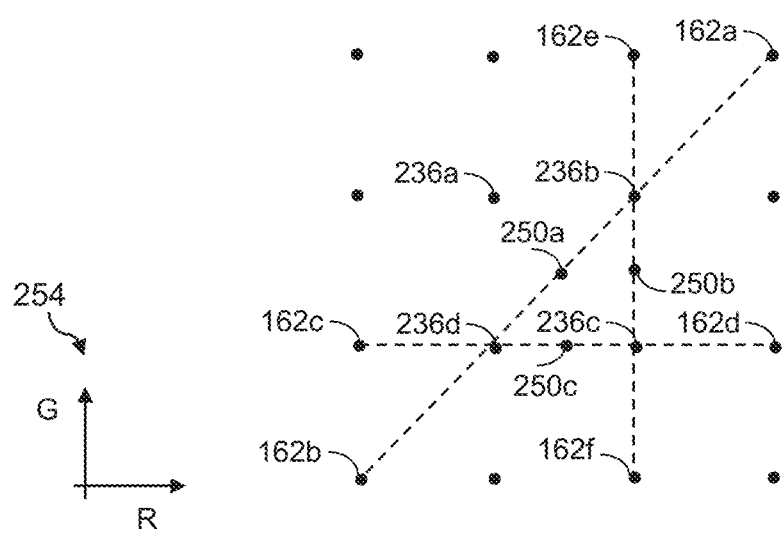
FIG. 11 illustrates schematically an example of an interpolation process for use with methods described herein.

In the examples described above with reference to FIG. 7, a series of linear interpolation processes are used to generate the additional transform data associated with the additional sampling points 150a, 150b, 150c. FIG. 11 shows an alternative example method of obtaining the additional transform data. Features of FIG. 11 similar to corresponding features of FIG. 7 are labelled with corresponding reference numerals incremented by 100; corresponding descriptions are to be taken to apply. In FIG. 7, lines are used to illustrate schematically a grid, with the sampling points and the additional sampling points located on grid points of the grid, and a line also illustrating a relationship between the location of the first additional sampling point 150a and the second and fourth sampling points 136b, 136d. In FIG. 11, though, such lines are omitted, for clarity. Instead, dashed lines show points that may be involved in various interpolation processes, as described further below.

FIG. 11 may be considered to illustrate an example of a higher-order one-dimensional directional interpolation for generating the additional transform data. FIG. 11 illustrates four sampling points 236a, 236b, 236c, 236d (collectively referred to with the reference numeral 236) which are arranged on the boundary of a square region. These sampling points are associated with transform data. However, FIG. 11 also includes further sampling points, which are located at grid points outside the region with the boundary including the sampling points 236. These further sampling points include further transform data, which may be similar to the transform data but associated with a different spatial location in the coordinate system (which in this example is the first coordinate system 254).

In cases such as FIG. 11, methods such as those described herein may include obtaining the further transform data associated with a plurality of the further sampling points, each further sampling point located outside the region, and processing the transform data and the further transform data to generate the additional transform data. For example, these methods may include obtaining further transform data associated with the plurality of further sampling points 162a to 162f, in order to perform interpolation of the transform data and the further transform data.

As an example, the first and second further sampling points 162a, 162b and second and fourth sampling points 236b, 236d in FIG. 11 lie on a straight line and may therefore be used for interpolation of a value associated with a further point on that straight line (in this example, the first additional sampling point 250a). In examples such as this, the transform data is associated with two sampling points (236b, 236d) and the further transform data is associated with two further sampling points (162a, 162b), and the point (250a) is located between the two sampling points (236b, 236d) and between the two further sampling points (162a, 162b). Thus, by interpolating the transform data and the further transform data, an interpolated transform value associated with the point 250a may be obtained. In this example, although the first and second further sampling points 162a, 162b and the second and fourth sampling points 236b, 236d in FIG. 11 lie on a straight line, the transform data associated with the second and fourth sampling points 236b, 236d and the further transform data associated with the first and second further sampling points 162a, 162b may not increase linearly. Thus, by performing higher-order interpolation, the interpolated value associated with the first additional sampling point 250a may be more accurate than if determined using linear interpolation.

In other examples, though, some or all of the first and second further sampling points 162a, 162b and second and fourth sampling points 236b, 236d may not be located on a straight line. In these other examples, the point 250a may nevertheless be located between two sampling points and between the two further sampling points.

The interpolation of the transform data and the further transform data may include polynomial interpolation of the transform data and the further transform data with a polynomial of degree larger than 1, such as a quadratic, cubic, quartic etc. polynomial, where a polynomial of degree 1 is a linear polynomial. The degree of a polynomial may also be referred to as the order of the polynomial. Thus, the interpolations in examples in accordance with FIG. 11 may be considered to correspond to higher-order one-dimensional interpolations than the linear interpolation illustrated in FIG. 7 to calculate the additional transform data associated with the additional sampling point 150a. Polynomial interpolation may involve the use of piecewise polynomials, which may be referred to as splines. For example, a cubic (or other order larger than 1) spline may be used to approximate the interpolated transform value, based on the transform data and the further transform data. In other examples, though, polynomial interpolation may involve the use of a continuous polynomial rather than a piecewise polynomial.

In examples, methods such as FIG. 11 may involve a plurality of interpolations in different directions, with each different interpolation used to calculate additional transform data for a different additional sampling point. For example, in FIG. 11, three interpolations are performed (in the directions indicated with the dashed lines) to generate the additional transform data associated with the additional sampling points 250a, 250b, 250c. For example, processing the transform data and the further transform data may include a first interpolation of the transform data and the further transform data in a first direction to generate first additional transform data and a second interpolation of the transform data and the further transform data in a second direction different from the first direction to generate second additional transform. In such cases, the additional transform data may include the first additional transform data and the second additional transform data. Each of the different interpolations may use the same process, for example using a polynomial of the same degree as each other. Alternatively, some of the interpolations may be different from others. For example, some of the interpolations may use quadratic polynomials whereas others may use cubic polynomials.

Thus, in the example of FIG. 11, two further sampling points are used for the generation of the additional transform data associated with each additional sampling point. However, by including these further sampling points, the additional transform data may more accurately reflect the true value of the transform at the additional sampling point.

It is to be appreciated that the example of FIG. 11 is shown in two dimensions. In other examples, with a larger number of dimensions, further transform data associated with a larger number of further sampling points than in the two dimensional example of FIG. 11 may be used to further improve the accuracy of the generated additional transform data. In such cases one dimensional interpolation may be performed in a larger number of directions than those shown in FIG. 11.

Moreover, while the example of FIG. 11 describes the use of higher order one dimensional interpolation to calculate an interpolated transform value based on transform data and further transform data, it is to be understood that the methods of FIG. 11 may be used in other contexts or situations to interpolate other data or values. For example, methods of FIG. 11 may be used more generally to interpolate a value at a point based on data associated with at least two points on either side of the point in a given direction (such as along an axis of a coordinate system).

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of image data interpolation, the method comprising:
    obtaining transform data associated with a plurality of sampling points, each sampling point located on a boundary of a region;
    processing the transform data to generate additional transform data associated with an additional sampling point located on a boundary of a subregion of the region; and
    performing an interpolation process comprising processing image data associated with a point within the subregion with the additional transform data, thereby generating interpolated image data representative of an interpolated data value at the point,
    wherein the method comprises applying a bit shift operation to sampling location data representative of a location of a sampling point to generate additional location data representative of a location of the additional sampling point.

2. The method according to claim 1, wherein the location of the additional sampling point with respect to an axis of a coordinate system corresponds to the location of the sampling point with respect to the axis of the coordinate system divided by a factor of two.

3. The method according to claim 1, wherein the bit shift operation reduces a bit precision of the sampling location data.

4. The method according to claim 1, wherein the region is divisible into a plurality of predetermined subregions comprising the subregion, and the method comprises:
    processing location data representative of a location of the point to determine that the point is located within the subregion; and
    processing the sampling location data, wherein the sampling location data is representative of a respective location of each of at least one of the plurality of sampling points, to calculate the location of the additional sampling point on the boundary of the subregion, thereby generating the additional location data representative of the location of the additional sampling point.

5. The method according to claim 4, wherein the processing the location data comprises processing the location data to determine that the point is located within the subregion on the basis of at least one most significant bit of the location data.

6. The method according to claim 1, wherein the image data represents colour channel data for a first colour space and the interpolation process is for transforming the colour channel data to a second colour space different from the first colour space.

7. The method according to claim 1, wherein the interpolation process is a second interpolation process and the processing the transform data comprises a first interpolation process different from the second interpolation process.

8. The method according to claim 1, wherein the transform data comprises:
a first set of transform data associated with a first at least one sampling point of the plurality of sampling points; and
a second set of transform data associated with a second at least one sampling point of the plurality of the sampling points; and the method comprises:
retrieving the first set of transform data from first storage; and
retrieving the second set of transform data from second storage different from the first storage.

9. The method according to claim 1, comprising increasing a bit precision of the transform data before the processing the transform data to generate the additional transform data.

10. The method according to claim 1, wherein the image data is second image data and the method comprises:
obtaining first image data representative of a location of the point in a first coordinate system; and
processing the first image data to generate the second image data, the second image data representative of the location of the point in a second coordinate system different from the first coordinate system.

11. The method according to claim 10, wherein a sampling point corresponds to an origin of the first coordinate system and the additional sampling point corresponds to an origin of the second coordinate system.

12. The method according to claim 10, wherein, in the second coordinate system, there are a plurality of boundary points located on the boundary of the subregion, the plurality of boundary points comprising the additional sampling point, the method comprising renormalizing the second coordinate system such that there is a predetermined distance between neighbouring boundary points.

13. The method according to claim 12, wherein the predetermined distance between the neighbouring boundary points is equal to two to the power of a bit width of the image data.

14. The method according to claim 1, wherein the processing the transform data corresponds to a first pre-interpolation process, and the method comprises a plurality of pre-interpolation processes comprising the first pre-interpolation process, an output of each successive intermediate pre-interpolation process being used as an input to a subsequent pre-interpolation process.

15. The method according to claim 14, wherein each of the pre-interpolation processes comprising processing previous additional transform data associated with a previous additional sampling point of a previous pre-interpolation process to generate subsequent additional transform data associated with a subsequent additional sampling point located on a boundary of a subsequent subregion,
wherein the subsequent subregion is a subregion of a previous subregion, the previous additional sampling point of the previous pre-interpolation process located on a boundary of the previous subregion.

16. The method according to claim 1, comprising obtaining further transform data associated with a plurality of further sampling points, each further sampling point located outside the region; and
processing the transform data and the further transform data to generate the additional transform data.

17. The method according to claim 16, wherein the processing the transform data and the further transform data comprises polynomial interpolation of the transform data and the further transform data with a polynomial of degree larger than 1.

18. The method according to claim 16, wherein the processing the transform data and the further transform data comprises a first interpolation of the transform data and the further transform data in a first direction to generate first additional transform data and a second interpolation of the transform data and the further transform data in a second direction different from the first direction to generate second additional transform data,
wherein the additional transform data comprises the first additional transform data and the second additional transform data.

19. The method according to claim 16, wherein the transform data is associated with two sampling points and the further transform data is associated with two further sampling points, and the point is located between the two sampling points and between the two further sampling points.

20. The method according to claim 1, wherein the region corresponds to a first polyhedron and the subregion corresponds to a second polyhedron.

* * * * *